United States Patent [19]

Putzar

[11] Patent Number: 4,465,492

[45] Date of Patent: Aug. 14, 1984

[54] PROCESS FOR THE PREPARATION OF CONCENTRATED AQUEOUS FORMULATIONS OF SYNTHETIC ANIONIC DISPERSANTS AND THE USE THEREOF

[75] Inventor: Roland Putzar, Therwil, Switzerland

[73] Assignee: Ciba-Geigy Corporation, Ardsley, N.Y.

[21] Appl. No.: 408,580

[22] Filed: Aug. 17, 1982

[30] Foreign Application Priority Data

Aug. 25, 1981 [CH] Switzerland ............... 5470/81

[51] Int. Cl.$^3$ ................................ C09B 67/20
[52] U.S. Cl. ................................ 8/589; 8/524; 8/527; 106/20; 106/308 Q; 106/308 N; 210/653; 210/654; 252/308
[58] Field of Search ............... 8/589, 524, 527; 252/308; 106/20, 308 Q, 308 N; 210/653, 654

[56] References Cited

U.S. PATENT DOCUMENTS 3,723,306 3/1973 Bridgeford .................. 210/638
3,857,782 12/1974 Crowley ..................... 210/500.2
3,872,001 3/1975 Davis et al. ................ 210/638
4,247,401 1/1981 Bloch et al. ................ 210/638

FOREIGN PATENT DOCUMENTS 26399 4/1981 European Pat. Off. .
47953 3/1982 European Pat. Off. .
61610 10/1982 European Pat. Off. .
2058798 4/1981 United Kingdom .

Primary Examiner—A. Lionel Clingman
Attorney, Agent, or Firm—Edward McC. Roberts

[57] ABSTRACT

In a process for the preparation of concentrated aqueous formulations of synthetic anionic dispersants, dilute reaction solutions of said dispersants are subjected to reverse osmosis using membranes which contain ionic groups and have a pore diameter of 1 to 500 Å. The dispersant formulations have a high concentration of active ingredient. They are suitable for the preparation of pigment and dye compositions and impart excellent stability to them, e.g. at elevated temperature and against mechanical influences.

14 Claims, No Drawings

PROCESS FOR THE PREPARATION OF CONCENTRATED AQUEOUS FORMULATIONS OF SYNTHETIC ANIONIC DISPERSANTS AND THE USE THEREOF

The present invention relates to the preparation of very pure, concentrated aqueous formulations of synthetic anionic dispersants and to the use thereof for preparing e.g. dye or pigment compositions in liquid or powder form.

Arising out of their preparation, synthetic dispersants (usually condensation products) contain large amounts, e.g. about up to 20% by weight, of inorganic salts as well as further amounts of so-called low molecular constituents (e.g. non-reacted starting materials) which have no dispersibility and act only as ballast. The amount of ballast may comprise up to 30% by weight, based on the dispersants, in particular on the condensation products.

It is the object of the present invention to remove the salts and low molecular constituents referred to above as ballast from the dispersants in order to obtain aqueous concentrated formulations of dispersants having as high a concentration of active ingredient as possible, i.e. a content of compounds having dispersing action.

This object is accomplished according to the present invention by removing low molecular constituents and salts from reaction solutions or reaction mixtures of synthetic anionic dispersants by means of a reverse osmosis process and concentrating said solutions or mixtures.

Accordingly, the present invention provides a process for the preparation of concentrated aqueous formulations of synthetic anionic dispersants, which process comprises subjecting dilute reaction solutions of said dispersants to reverse osmosis using membranes which contain ionic groups and have a pore diameter of 1 to 500 Å, preferably of 10 to 200 Å.

Further objects of the invention are the dispersant formulations obtained by the process of the invention, the use thereof for preparing dye or pigment compositions which contain sparingly water-soluble dyes or pigments or also water-soluble dyes, processes for preparing said dye or pigment compositions, as well as dyeing processes which comprise the use of aqueous dyebaths or pigment suspensions which have been obtained from said dye or pigment compositions. These and other objects of the present invention are described in more detail below.

The dispersants are known products which are prepared by known methods and are described e.g. in U.S. Pat. Nos. 2,199,806 and 3,849,162, in British Pat. specification Nos. 1,101,671, 1,239,016 and 1,507,772, and in German Offenlegungsschrift specification Nos. 1 469 606, 2 353 691 and 2 820 717. Typical examples are sulfated alkylene oxide adducts, sulfated and partially esterified polyhydric alcohols, alkyl sulfonates, sodium dialkyl sulfosuccinates, alkyl benzenesulfonates, condensation products of naphthalenesulfonic acids and formaldehyde, condensation products of ditolyl ether, formaldehyde and sulfuric acid, condensation products of chloromethylated diphenylene, naphthalene and sulfuric acid, condensation products of mononuclear aromatic compounds, formaldehyde, naphthalenesulfonic acids and optionally sodium sulfite, or condensation products of naphthalene, toluene, formaldehyde and sulfuric acid.

Preferred dispersants are the last mentioned condensation products, in particular condensation products of benzene- and/or naphthalenemonosulfonic acids which may be substituted by alkyl of 1 to 10, preferably 1 to 4, carbon atoms, e.g. by methyl, ethyl or butyl, and formaldehyde.

Further suitable dispersants are condensation products of e.g.

cresol, formaldehyde, sodium sulfite (or sodium hydrogen sulfite) and optionally urea,
styrene, acrylic acid and maleic anhydride,
urea, propylene oxide, ethylene oxide and chlorosulfonic acid,
glycerol, ethylene oxide and chlorosulfonic acid,
phenolsulfonic acids, urea, formaldehyde and optionally sodium hydrogen sulfite,
ketones, formaldehyde and sodium hydrogen sulfite,
1- and 2-naphthol, sulfuric acid, urea and formaldehyde.

Preferred dispersants are condensation products, or their technical mixtures, of unsubstituted or substituted benzenesulfonic and/or naphthalenesulfonic acids and formaldehyde, as already indicated above.

The dilute reaction solutions which are subjected to reverse osmosis in the process of this invention normally contain about 5 to 30% by weight of dispersant, while the content of low molecular constituents (salts, starting materials, by-products) is in the region of 0.1 to 10% weight, based on the entire solution.

After purification and concentration of the dilute solutions there are obtained concentrated aqueous formulations which contain less than 0.1% to at most 5% by weight of salts or by-products, while the concentration of dispersant is in the range from about 20 to 50% by weight, based on the entire concentrated solution.

The preferred membranes employed in the process of this invention consist substantially of a polymer material which is modified at least at the surface by radicals which contain ionisable groups. It is possible in this manner to modify natural, regenerated or synthetic materials to give membranes. A polymer material to be modified in this manner may contain, as reactive group, e.g. hydroxyl, amino and/or amidoxime groups ($C=N-OH$). It can then be reacted with suitable reagents which, on the one hand, contain ionisable groups and, on the other, at least one reactive group to form a chemical, preferably a covalent, bond.

The following polymeric compounds, for example, may be modified in the indicated manner:
cellulose acetates, e.g. those having a low content of acetyl groups, but also higher acylated cellulose, e.g. 2½-acetate, or
polyvinyl alcohols, or
polyacrylonitrile and copolymers of acrylonitrile and other monomers having ethylenic unsaturation.

Suitable reactive reagents which contain an ionisable group are colourless and coloured compounds, e.g. ionic reactive dyes which may belong to different classes, such as anthraquinone, azo or formazane dyes. They may also be in the form of metal complexes. Typical examples of reactive groups are: carboxylic acid halide groups, sulfonic acid halide groups, radicals of $\alpha,\beta$-unsaturated carboxylic acids or amides, e.g. radicals of acrylic, methacrylic, $\alpha$-chloroacrylic or $\alpha$-bromoacrylic acid, acrylamide radicals, radicals of preferably lower haloalkylcarboxylic acids, e.g. of chloroacetic acid, $\alpha,\beta$-dichloropropionic acid or $\alpha,\beta$-dibromopropionic acid; radicals of fluorocyclobutanecarboxylic acids, e.g. of tri- or tetrafluorocyclobutanecarboxylic acid; radicals containing vinylacyl groups, e.g. vinylsulfonyl groups or carboxyvinyl groups; radicals which contain ethylsulfonyl groups ($-SO_2CH_2CH_2OSO_2OH$, $-SO_2CH_2CH_2Cl$) or ethylaminosulfonyl groups, e.g. radicals or dihaloquinoxalines, dihalopyridazones, dihalophthalazines, halobenzthiazoles, or preferably halogenated pyrimidines or 1,3,5-triazines, e.g. radicals of monohalotriazines, dihalotriazines, 2,4-dihalopyrimidines or 2,5,6-trihalopyrimidines. Suitable halogen atoms in the above radicals are fluorine, bromine and, in particular, chlorine atoms.

Examples of suitable ionisable groups are sulfato groups, sulfonic acid groups, sulfonamide groups, carboxylic acid groups, carboxamide groups, hydroxyl, thiol, isocyanate and/or isothiocyanate groups, primary, secondary or tertiary amino groups, and also phosphonium or sulfonium groups. Reactive compounds (reactive dyes) containing sulfonic acid groups, carboxylic acid groups or ammonium groups, are preferred.

Particularly advantageous results are obtained in some cases with compounds which contain sulfonic acid groups. Those polymer membranes are particularly useful and versatile which are modified by an azo dye which contains sulfonic acid groups. The azo dye may also contain a complexed metal. e.g. copper.

Membranes obtained from preferably partially acetylated cellulose acetate may be modified e.g. by reaction with the reactive ionic compounds previously referred to, especially anionic reactive dyes. Such membranes are described e.g. in German Offenlegungsschrift No. 2 505 254.

A further modification of cellulose acetate can be effected e.g. by the following chemical reactions, preferably in the indicated sequence: polyfunctional monomer containing at least two functional groups (e.g. cyanuric chloride), polyfunctional oligomer or polymer (e.g. polyethyleneimine), ionic compound (e.g. ionic reactive dye which contains reactive groups and ionic groups of the kind indicated above). Such modified cellulose acetate membranes are described, inter alia, in European patent application No. 26 399.

Membranes which contain polyvinyl alcohol may also be modified in corresponding manner.

The polyfunctional monomer preferably contains at least two functional groups. Examples of suitable compounds are cyclic carbonimide halides, isocyanates, isothiocyanates or N-methylol compounds, with halodiazines or halotriazines, e.g. cyanuric halides, preferably cyanuric chloride, or tri- or tetrahalopyrimidines, preferably tetrachloropyrimidine, being particularly suitable.

The polyfunctional oligomers or polymers contain in particular aliphatic or aromatic amino, hydroxyl, thiol, isocyanate and/or isothiocyanate groups. Suitable polyfunctional polymers are e.g. polyethyleneimine, polyvinyl alcohol, cellulose derivatives, polyvinylamine or polyvinyl aniline, with polyethyleneimine being preferred. The membrane contains, as ionic groups, preferably sulfonic acid, carboxylic acid or ammonium groups, Membranes which contain the radicals of an anionic reactive dye are particularly advantageous.

In addition, it is also possible to use those membranes which consist of a basic skeleton which contains polyacrylonitrile or a polymer of acrylonitrile and other monomers having ethylenic unsaturation, and which are described e.g. in European patent application No. 25 973.

Amidoxime groups are introduced into the membrane by reaction with hydroxylamine, and the membrane is then modified in the same way as cellulose acetate membranes in accordance with European patent application No. 26 399.

The content of acrylonitrile units in the basic skeleton of the membrane is advantageously at least 5% by weight and preferably at least 20% by weight. Preferred are copolymers of acrylonitrile and vinyl acetate, vinyl ethers, vinyl pyridine, vinyl chloride, styrene, butadiene, acrylic acid, methacrylic acid, maleic anhydride, 2-aminomethylmethacrylate or allyl compounds or also terpolymers or tetrapolymers of acrylonitrile.

The so modified membranes may also in addition be subjected to a heat treatment ("tempering"), by means of which the pore size of the membrane skin is substantially determined. The membrane is treated e.g. for 1 to 30 minutes at a temperature in the range from 60° to 90° C., conveniently by immersing it in warm water. If appropriate, the heat treatment may also be carried out before the reaction with the reactive compound which contains ionisable groups. Further, the reaction may also be carried out before the polymeric material is processed to the asymmetrical membrane.

The membranes may be in different forms, e.g. disc-shaped, lamellar, tube-shaped, in the form of a bag, cone or of hollow fibres. In order to use them effectively for the separation of substances, they have to be integrated into appropriate systems (modules) and incorporated into units e.g. for pressure permeation.

The above described membranes employed in the process of this invention for separating and/or purifying dilute dispersant solutions by the principle of reverse osmosis are those which have a molecular weight cutoff in the range from 300 to 500, preferably from 400 to 500, and which are symmetrical or, preferably, asymmetrical. They allow water and dissolved substances whose molecular weight is below the cutoff to pass through at high rates per unit of area and at low to medium pressure. The pressure may be applied e.g. by means of a pump. When carrying out the process, pH values and temperatures may vary within wide ranges. As a rule they are not crucial for the membranes employed.

In a single passage through the membrane, the degree of purification and/or demineralisation, without loss of dispersant, can be up to 70% and more. Moreover, the volume of the solution of the retained substances (in the concentrate) decreases correspondingly and the concentration of the retained portion increases. If a further reduction of the low molecular constituents is desired, this may be accomplished without difficulty after conveniently diluting the retained solution or suspension with water to the initial volume by repeating the process once or more than once. The separation may also be carried out continuously by adapting the rate of addition of water to that of the permeate membrane. Demineralisation and purification effects of up to 95% or, if desired, even up to 99% and more, i.e. until the permeate is free from undesirable matter, may be obtained discontinuously and continuously in this simple manner at room temperature (15° to 25° C.).

The very pure concentrated liquid dispersant formulations obtained according to this invention are true solutions. They are of low viscosity and very storage stable, i.e. they remain in a ready for use condition for at least several months in the temperature range from −20° to +60° C., preferably from −10° to +40° C.

These formulations may be used for preparing compositions of sparingly water-soluble or water-insoluble dyestuffs, to which compositions are in turn added both water and organic solvents and/or thickeners without causing precipitation of the colourant or other forms of inhomogeneity.

The sparingly water-soluble or water-insoluble dyestuffs are e.g. anionic dyes including metal complex dyes, vat and disperse dyes, and also pigments, which dyestuffs may belong to the different chemical classes (e.g. azo, azomethine, nitro and anthraquinone dyes). For further particulars concerning the dyes, attention is drawn to the appropriate sections of the Colour Index, 3rd Edition, 1971, published by the Society of Dyers and Colourists.

If desired or appropriate, the dispersant formulations obtained by the process of this invention may also be used in compositions of water-soluble dyes (reactive, direct, metal complex dyes) in amounts of about 0.1% by weight, preferably in the range from 1 to 80% by weight, based on the dye.

When preparing the concentrated dye or pigment compositions using the dispersant formulations of this invention, the dyes may be used in any form, e.g. as powder, filter cake or or aqueous suspension (dispersion), and the pigments e.g. in the form of an aqueous suspension. The dyes may be in pure form or together with conventional extenders or assistants.

In detail, the procedure may be such that the preferably sparingly soluble or insoluble dyes and the pigments, if appropriate after addition of water, are mixed with a portion or with the entire amount of the dispersant and "liquefied" with efficient stirring. The mixture, if appropriate with the further addition of dispersant, is then subjected to wet milling (wet grinding, kneading) in a conventional colloid mill, vibrating ball-mill or kneader. The homogeneity of the dispersion is not thereby effected.

The amount of dispersant employed may vary within wide limits and is in the range from about 10 to 500% by weight, preferably from 50 to 200% by weight, based on the colourant.

The preferably concentrated dye or pigment dispersions obtained after the wet milling have excellent stability. They may be used as liquid dye or pigment compositions for a very wide variety of purposes. The addition of conventional assistants (antifoams, preservatives, hydrotropic agents) poses no problems. In particular, the compositions are suitable for preparing dyebaths, e.g. by dilution with water, which dyebaths are used for dyeing textile materials, especially textile materials of e.g. polyesters, polyamide 6 and 66, polyacrylonitrile or cellulose acetate (2½-acetate or triacetate) fibres, optionally in admixture with other materials.

The materials to be dyed may be in any make-up, e.g. tow, yarn, flocks, package, muff, wovens or knits, and may be dyed or printed by the conventional processes. The dyebaths are also stable at elevated temperatures and are therefore particularly suitable for the high-temperature dyeing of synthetic textile fabrics. The dyeings obtained contain no dye deposits and are fast to crocking.

The pigment dispersions are suitable e.g. for the preparation of disperse paints as well as for the preparation of printing inks for paper and for textile printing, and especially for the dope dyeing of synthetic fibres in the spinning solution. Paste formulations have moreover a lower viscosity, so that their dyestuff concentration may conveniently be increased.

If appropriate, the liquid, preferably aqueous, dye or pigment compositions obtained with the dispersant formulations of the invention may also be converted into powder form by means of conventional drying methods, especially spray drying.

The compositions in powder form are readily wettable and redispersible and can be reconverted without much trouble into a usable, preferably liquid form.

In the following preparatory Examples and use Examples, percentages are by weight.

PREPARATORY EXAMPLES FOR OBTAINING MEMBRANES

The preferred membranes for use in this invention may be prepared e.g. as follows in accordance with Example 1 of German Offenlegungsschrift No. 2 505 254:

A solution is prepared from 25 g of cellulose acetate (degree of acetylation=39.8%), 45 g of acetone and 30 g of formamide. This solution is left to stand for 3 days, poured onto a glass plate and spread with a spatula to a 0.6 mm layer. The solvent is allowed to evaporate for 5 seconds at 25° C. and the glass plate is then immersed for 2 hours in ice-water and the membrane so obtained is removed from the plate.

The membrane is then immersed in a 5% aqueous solution of the 1:2 chromium complex of the dye of the formula

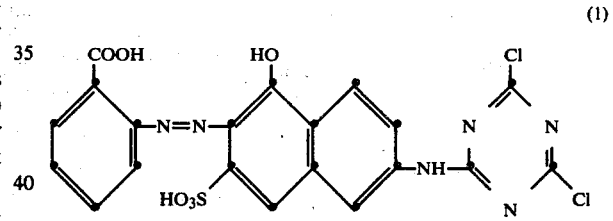

and kept therein for 48 hours at pH 6 and a temperature of 25° C. The pH of the dye solution is then adjusted to 10.4 with sodium hydroxide solution and the solution is constantly agitated for 40 minutes at 25° C.

Instead of treating the membrane in two steps with the dye solution, it may also be treated in a single step for 2½ hours at pH 10.5 and 25° C. with a 10% solution of the chromium complex dye. For the subsequent heat treatment (tempering), the membrane is immersed for 10 minutes in water of 60° C. The preparation of further suitable membranes is described in the other Examples of German Offenlegungsschrift No. 3 035 134 as well as in European patent application No. 26 399.

EXAMPLE 1

A 20% aqueous solution of the reaction mixture of a naphthalenesulfonate/formaldehyde condensation is pumped at room temperature and a pressure of 25 bar through a reverse osmosis unit which is provided with the previously described modified cellulose acetate membranes (cutoff at a molecular weight of about 500). The final concentration in the dispersant is 20 to 35%. The daily flow rate through the membrane is 500 l/m².

To obtain a 1% concentration of ballast (salts, starting materials, by-products), based on the dry weight of the dispersant, it is necessary e.g. to pump the dispersant solution 5 times through the membrane, the solution being adjusted again to a solids content of 20% after each passage.

EXAMPLE 2

178 parts of dispersant which is purified and concentrated (25%) according to Example 1 are mixed with 22 parts of a disperse dye of the formula

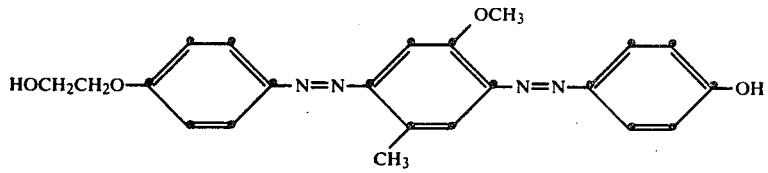
(2)

and the mixture is ground in an attrition mill until the dye has a particle size in the range from 1 to 3 μm.

The dispersion, which is stable for several weeks when stored, is then dried in a laboratory spray drier at an input temperature of 160° C. and an exit temperature of 80° to 90° C. An orange dye powder which is readily redispersible in water is obtained.

500 parts of polyester combed top are dyed for 45 minutes in a circulating dyeing machine with 15 parts of the above dye powder at 130° C. by the HT (high-temperature) process. The liquor to goods ratio is 1:10. The dyeing obtained is level and fast to crocking. If dyeing is carried out with the same dye composition prepared with a dispersant which has not been purified by reverse osmosis, distinct deposits of dye, which are visible at the conclusion of dyeing by rubbing (low crockfastness), are found on the substrate.

EXAMPLE 3

Improvement of HT circulation dyeing on polyester wound packages 21.6 g of the pink disperse dye of the formula

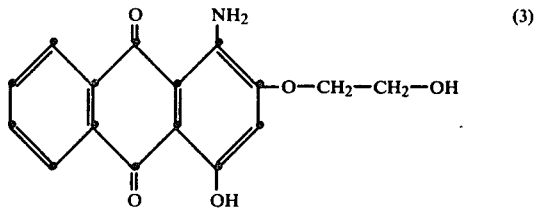
(3)

and 178.4 g of a naphthalenesulfonate/formaldehyde condensation product purified by reverse osmosis as in Example 1 (22% content of dispersant) are ground in an attrition mill until the dye particles have a maximum size of 1 to 3 μm. The resultant dispersion is spray dried in a laboratory spray drier at an input temperature of 160° C. and an exit temperature of 85° C. to give a pink dye powder which is readily redispersible in water.

500 g of polyester in muff form are dyed by HT circulation dyeing with 14 g of the above dye powder at a temperature of 130° C. and a liquor to goods ratio of 1:10. A level dyeing of good crockfastness without visible deposits of dye is obtained.

A similar dye composition prepared with a naphthalenesulfonate condensate which has not been purified by reverse osmosis gives a dyeing with visible dye deposits and poor crockfastness.

EXAMPLE 4

Improvement of HT circulation dyeing on polyester wound packages 4 g of the disperse dye of the formula

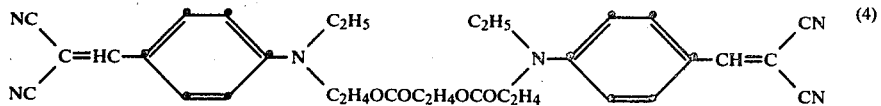
(4)

and 186 g of naphthalenesulfonate condensate (30% content of dispersant) purified by reverse osmosis as in Example 1 are ground for 24 hours in an attrition mill until the dye particles have a maximum size of 3 to 4 μm. The subsequent spray drying at 150°/80° C. (as in Example 3) gives a powder which is readily redispersible in water. HT circulation dyeing using 7.5 g of this dye powder gives on 500 g of polyester in muff form an absolutely level dyeing of good crockfastness.

The use of a dye composition prepared with the same dispersant which has not been purified by reverse osmosis gives dye deposits on the substrate, which consequently has poor crockfastness.

EXAMPLE 5

Improvement of redispersibility after spray drying 45 g of the disperse dye of the formula

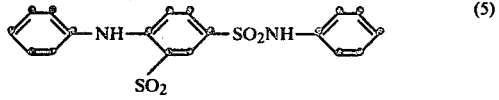
(5)

and 105 g of the dispersant purified by reverse osmosis as in Example 1 (40% content of dispersant) are ground in an attrition mill. A filter test shows the resultant dispersion to have good properties. The filtration time is from 10 to 20 seconds and scarcely any dye remains on the filter paper.

A yellow dye powder which is readily redispersible in water is obtained after spray drying at 150°/180° C.

If a dispersant which has not been purified by reverse osmosis is used for the same dye composition and the same procedure is employed, distinct dye residues are found when the dispersion is subjected to the filter test.

EXAMPLE 6

Foam reduction of the aqueous dispersant solution in HT circulation dyeing.

A condensation product of naphthalene/toluene/formaldehyde/sulfuric acid is prepared. The resultant dispersant is subjected to purification by reverse osmosis as in Example 1.

Measurement of the foam formation of an aqueous solution of 1 g/l of dispersant in the foam testing apparatus described in German Offenlegungsschrift No. 2 161 172 shows in the HT range a substantially lower foam formation than the same product which has not been purified by reverse osmosis.

EXAMPLE 7

Improvement of the storage stability of a pigment composition 30 g of indigo and 17 g of the dispersant purified by reverse osmosis as in Example 1 (30% content of dispersant) are ground in 65 g of water in an attrition mill to a particle size of 1 μm. The resultant paste is of low viscosity, storage stable and suitable for dope dyeing with a viscose spinning solution.

If the same dispersant is not purified by reverse osmosis and is used for the same pigment composition, the procedure being the same, the resultant paste is viscous and not storage stable.

What is claimed is:

1. A process for the preparation of a concentrated aqueous formulation of a synthetic anionic dispersant selected from the group consisting of sulfated alkylene oxide adducts, sulfated and partially esterified polyhydric alcohols, alkyl sulfonates, sodium dialkyl sulfosuccinates, alkyl benzenesulfonates, condensation products of naphthalenesulfonic acids and formaldehyde, condensation products ditoly ether, formaldehyde and sulfuric acid, condensation products of chloromethylated diphenylene, naphthalene and sulfuric acid, condensation products of mononuclear aromatic compounds, formaldehyde and naphthalenesulfonic acid, condensation products of mononuclear aromatic compounds, formaldehyde, naphthalenesulfonic acids and sodium sulfite, and condensation products of naphthalene, toluene, formaldehyde and sulfuric acid, which process comprises subjecting the dilute reaction solution of said dispersant to reverse osmosis using a membrane which contains ionic groups and has a pore diameter of 1 to 500 Å.

2. A process according to claim 1, wherein the dilute reaction solution has a dispersant concentration of 5 to 30% by weight and the concentration of low molecular weight salts, starting materials and by-products is from 0.1 to 10% by weight, based on the entire solution.

3. A process according to claim 1, wherein the dispersant is a technical mixture of condensation products of unsubstituted or substituted benzenesulfonic and/or naphthalenesulfonic acids and formaldehyde.

4. A process according to claim 1, wherein the membrane has a molecular weight cutoff in the range from 300 to 500.

5. A process according to claim 1, wherein the membrane is asymmetrical.

6. A process according to claim 1, wherein the membrane consists of a cellulose acetate basic skeleton which is modified by reaction with a reactive dye which contains sulfonic acid groups, carboxylic acid groups or ammonium groups.

7. A process according to claim 1, wherein the membrane consists of a cellulose acetate basic skeleton which is modified by reaction with a cyclic carbonimide halide, an isocyanate, an isothiocyanate or a N-methylol compound.

8. A process according to claim 1, wherein the membrane consists of a cellulose acetate basic skeleton which is modified by reaction with a polyfunctional oligomer or polymer containing aliphatic or aromatic amino, hydroxyl or thiol groups.

9. A dispersant formulation prepared by the process as claimed in claim 1.

10. A process for the preparation of aqueous concentrated compositions of sparingly water-soluble or water-insoluble dyestuffs, which process comprises mixing said dyestuffs with a dispersant formulation as claimed in claim 9 and subjecting the mixture to wet milling.

11. A process for the preparation of readily redispersible powdered compositions of sparingly water-soluble or water-insoluble dyestuffs, which process comprises mixing said dyestuffs with a dispersant formulation as claimed in claim 9, subjecting the mixture to wet milling and subsequently drying it.

12. A process for dyeing or printing synthetic fibre materials, which process comprises treating said materials with aqueous dyebaths or printing pastes which are obtainable from a concentrated aqueous or powdered dyestuff composition as claimed in claim 10.

13. A process for the preparation of a concentrated aqueous or powdered pigment composition, which process comprises mixing the pigments with a dispersant formulation as claimed in claim 9, subjecting the mixture to wet milling and optionally drying it.

14. Process for the preparation of paints, printing inks for paper and textile printing, and of pigment compositions for the dope dyeing of synthetic fibres in the spinning solution, which process comprises the use of a pigment composition as claimed in claim 13.

* * * * *